F. STEVENS.
PARACHUTE CASE OR ENVELOP.
APPLICATION FILED SEPT. 12, 1917.
1,260,474.
Patented Mar. 26, 1918.
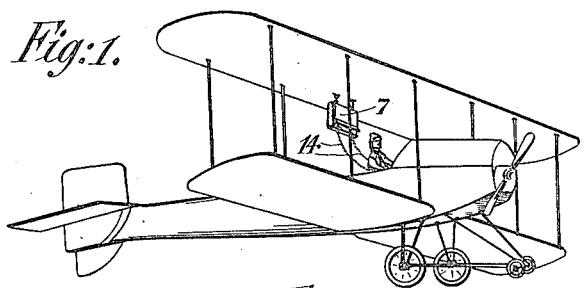
*Fig:1.*
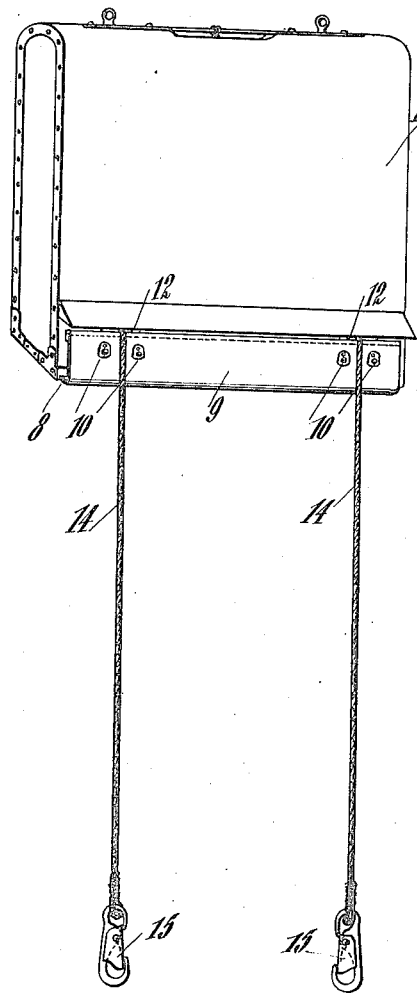
*Fig:2.*
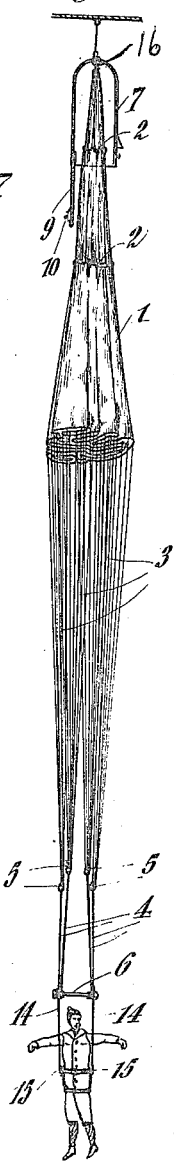
*Fig:3.*
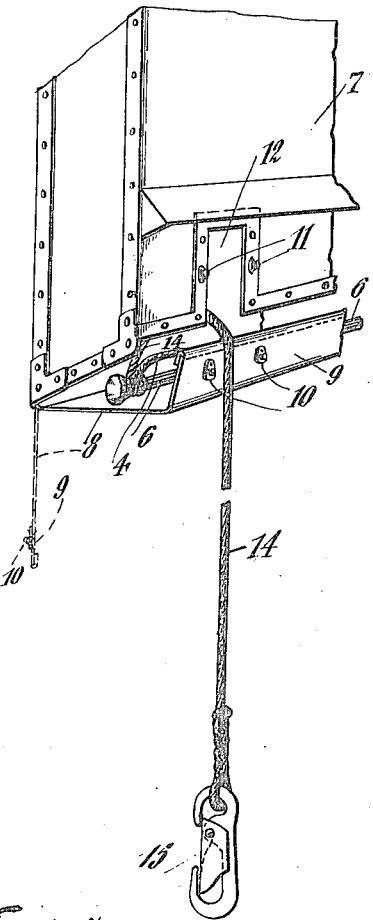
*Fig:4.*
Frank Stevens INVENTOR
Mock & Blum
his ATTORNEYS.

UNITED STATES PATENT OFFICE.

FRANK STEVENS, OF NEW YORK, N. Y., ASSIGNOR OF ONE-HALF TO JULIA STEVENS, OF NIAGARA FALLS, NEW YORK.

PARACHUTE CASE OR ENVELOP.

1,260,474.

Specification of Letters Patent. Patented Mar. 26, 1918.

Application filed September 12, 1917. Serial No. 190,939.

*To all whom it may concern:*

Be it known that I, FRANK STEVENS, a citizen of the United States, residing at borough of Bronx, in the county of Bronx, city and State of New York, have invented certain new and useful Improvements in Parachute Cases or Envelops, of which the following is a specification.

My invention relates to automatically operated parachutes for aviators and balloonists, and is intended to furnish an automatically operated and reliable device that shall be instantly opened, whenever required, and supply the aviator or balloonist with a means of escape in case the aeroplane or balloon is injured by accident, gun-fire or the like.

Parachutes have been heretofore supplied to aviators and balloonists, so that whenever required, they would furnish a means of escape to the ground. The object of my invention is to supply a parachute which will require no attention to set it into operation, but which will be automatically opened by the mere springing of the aviator or the balloonist from his aeroplane or balloon. Whenever a balloon or aeroplane is injured, it descends more slowly than a freely falling body because of the large surface it offers to the air, and hence, if the aviator or balloonist springs clear of his aeroplane or balloon, he falls more rapidly and so gets away from it. With my improved device, the springing of the aviator or the balloonist automatically opens the parachute in a safe, reliable, and efficient manner, so that no attention or care whatever is required.

My device also provides a compact and easily manipulated means for carrying and applying a parachute to the balloon or aeroplane.

Other objects of my invention will be disclosed in the following description and drawings which illustrate a preferred embodiment of my invention.

Figure 1 represents a perspective view of my device, applied to an aeroplane.

Fig. 2 represents a perspective view of my device detached from the aeroplane.

Fig. 3 is a perspective view of my device showing the parachute about to open.

Fig. 4 is a detail view in perspective, showing how the parachute is detached from its case or envelop.

The same reference numerals indicate the same parts in all figures.

The parachute 1 is made of any approved construction and is supplied with reinforcing canvas strips 2 so as to prevent a rip or tear in the material of the parachute from extending too far. It is made of any suitable size that may be necessary for the particular purposes for which it is to be used. The ribs or segments of the parachute, of which there are twenty-eight in this embodiment, have twenty-eight cords 3 fastened thereto. These cords 3 are fastened in sets of seven to four loops 5. The loops are connected by means of ropes 4 to a cross-bar or trapeze 6. The parachute is folded up a suitable number of times, the closed parachute being arranged in layers folded to and fro upon each other, so that each layer forms a U with the adjacent ones, and the folded and closed parachute which is now very compact, is placed into a case or envelop 7, which is made of any suitable material that is light, strong and durable. When the parachute 1 is placed into the envelop 7 the cross-bar 6 is placed at the bottom of the envelop directly adjacent the rotatable bottom 8, whose open position is shown in dotted lines in Fig. 4, and which is connected to the envelop in a hinge-like manner by a flap of flexible material or the like. The bottom 8 is provided with a vertical flange 9 which is connected thereto in a hinge-like manner by a flap of flexible material or the like, provided with openings 10. These openings 10 are adapted to be connected to spring fasteners 11 which are shaped like studs, so that when the bottom 8 is closed, the front flange 9 can be connected to the front of the envelop 7 by passing the spring fasteners 11 through the holes 10, so that the front flange 9, and hence the bottom 8 are kept in place.

However, they can be opened by exerting a sufficient pull to overcome the resistance of the spring fasteners 11. The front of the envelop has two recesses 12, between the fasteners 11. Through these recesses 12 two cords 14 attached to the cross bar 6, are passed. These cords 14 are preferably of the same length as cords 4. The cords 14 have at their lower ends buckles 15 by means of which connection can be made to a harness which is worn by the aviator or balloonist. This harness consists of a waist portion which encircles the waist of the user and to which the buckles 15 are connected. Ring-like portions are also attached to the waist portion of the harness, and fit tightly around the thighs of the user, so that when the waist portion has a pull exerted thereon, these leg or thigh portions are substantially at right angles to the body of the aviator or balloonist. The top of the parachute has an easily breakable connection 16 with the top of the envelop 7, such as a disk of transparent celluloid, or the like. The operation of my device is as follows:

While in the air, the aviator or balloonist wears the harness before mentioned, which is connected by the ropes 14 to the cross-bar 6. This cross-bar 6 rests against the bottom 8 of the envelop, which is maintained in the closed position. The envelop 7 is firmly secured to a suitable portion of the frame-work of the balloon basket or the aeroplane, preferably in such a position, that the aviator or balloonist can easily spring clear of his aeroplane or balloon.

When an accident occurs or when the baloon or aeroplane is injured by gun fire, or when any other emergency arises, the aviator or balloonist need only spring clear of the vehicle. His weight causes the harness to be tightened up and also causes the cross-bar 6 to force the bottom 8 open, so that it assumes a vertical position, as well as the front flange 9, so that no resistance is offered to the removal of the parachute.

The weight of the user also causes the parachute to be unfolded, and after it has assumed the unfolded position, the breakable connection 16 is broken.

In a very short time the weight of the aviator or the balloonist causes the parachute to open, so that he is carried safely to the ground. No independent action by the aviator or balloonist is required, save the springing from his aeroplane or balloon. There are no adjustments to make, and there is no possibility of any defect or delay in the action of the apparatus, as practical tests have shown.

I claim:

1. In combination, an envelop, a parachute in said envelop having ropes attached to its segments and connected to a rigid bar separate from said parachute; said bar being adjacent an openable face of said envelop located at its bottom, said bar being directly forced against said face to open it when a pull is exerted thereon.

2. In combination, an envelop, a parachute in said envelop, ropes connected to the segments of said parachute and attached to a rigid cross bar separate from said parachute at the bottom of said envelop, and yieldable means holding said cross bar within said envelop, the hold of said yieldable means being overcome to release said bar by a downward pull thereon.

3. In combination an envelop having an openable bottom, yieldable means for connecting said bottom to the body of said envelop, a parachute in said envelop having ropes attached to its segments and connected to a rigid cross bar separate from said parachute and located at the bottom of said envelop, the said cross bar being adjacent to said openable bottom, so that a downward pull on said cross bar forces it against said openable bottom to move it away from said envelop and cause the withdrawal of said parachute from said envelop.

4. In combination, an envelop having a bottom connected thereto in a hinge-like manner, said bottom having a flange connected to the front thereof in a hinge-like manner, yieldable spring means for connecting said flange to said envelop, a parachute in said envelop having ropes connected to its segments and attached to a cross bar, said cross bar being adjacent to said rotatable bottom, whereby when a suitable pull is exerted on said cross bar, the said bottom is swung open and the said parachute is withdrawn from said envelop.

5. In combination, an envelop having vertical recesses at the bottom of a face thereof, said envelop having a bottom connected thereto in a hinge-like manner, the connection between said envelop and said bottom being located at the bottom of that face of said envelop opposite to the said recessed face, said bottom having a vertical flange connected thereto in a hinge-like manner, which is adjacent to said recesses when the said bottom is closed, yieldable spring means for connecting said envelop and said flange, a parachute in said envelop having ropes attached to its segments connected to a rigid cross bar located adjacent said recesses, a harness adapted to be placed around the body of the aviator, ropes connecting said harness to the said cross bar and passing through said recesses, whereby when a pull is exerted upon the said harness, the said flange is forced away from the envelop, the said bottom is opened, and the parachute withdrawn from the envelop.

6. A parachute container having a face with vertical recesses at the bottom thereof, a bottom connected thereto in a hinge-like manner having a vertical flange connected to said bottom in a hinge-like manner adjacent said recesses, and yieldable spring means connecting said flange to said container.

In testimony whereof I hereunto affix my signature.

FRANK STEVENS.